(12) United States Patent
Bous (10) Patent No.: US 8,458,022 B2
(45) Date of Patent: *Jun. 4, 2013

(54) SYSTEM AND METHOD FOR CONDUCTING SALES

(75) Inventor: Joseph Bous, Washington, DC (US)

(73) Assignee: Joseph Bous, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/477,713

(22) Filed: May 22, 2012

(65) Prior Publication Data

US 2012/0232979 A1     Sep. 13, 2012

Related U.S. Application Data

(63) Continuation of application No. 11/776,019, filed on Jul. 11, 2007, now Pat. No. 8,185,434.

(51) Int. Cl.
*G06Q 30/00* (2012.01)

(52) U.S. Cl.
USPC ........................................ 705/14.1; 705/26.1

(58) Field of Classification Search
USPC ..................................................... 705/14, 26
See application file for complete search history.

(56) References Cited

U.S. PATENT DOCUMENTS

| | | | |
|---|---|---|---|
| 5,897,620 A | 4/1999 | Walker et al. | |
| 6,134,534 A | 10/2000 | Walker et al. | |
| 6,418,415 B1 | 7/2002 | Walker et al. | |
| 6,990,457 B1 * | 1/2006 | Litman et al. | 705/5 |
| 7,668,747 B2 | 2/2010 | Murphy et al. | |
| 7,711,604 B1 * | 5/2010 | Walker et al. | 705/26.5 |
| 8,078,503 B1 | 12/2011 | Mussman et al. | |
| 2002/0161645 A1 | 10/2002 | Walker et al. | |
| 2003/0208387 A1 | 11/2003 | Russell et al. | |
| 2005/0160014 A1 | 7/2005 | Moss et al. | |
| 2006/0155598 A1 | 7/2006 | Spurr et al. | |
| 2006/0212362 A1 * | 9/2006 | Donsbach et al. | 705/26 |
| 2008/0195503 A1 | 8/2008 | Habeishi | |
| 2008/0208834 A1 | 8/2008 | Boyer et al. | |
| 2008/0235594 A1 | 9/2008 | Bhumkar et al. | |
| 2008/0288362 A1 | 11/2008 | King | |
| 2010/0057530 A1 | 3/2010 | Parivash et al. | |
| 2010/0192066 A1 | 7/2010 | Wu | |
| 2010/0299269 A1 | 11/2010 | Martin | |
| 2011/0131109 A1 | 6/2011 | Pappas et al. | |

FOREIGN PATENT DOCUMENTS

WO     WO 01/37164     5/2001

* cited by examiner

*Primary Examiner* — Matthew L Hamilton (57) ABSTRACT

Disclosed are systems, methods, and computer readable-media for conducting sales. The method embodiment comprises receiving an inquiry with at least one parameter from a user associated with a sale of an item, identifying one or more discount items that satisfy the inquiry, identifying comparable items for each discount item at nondiscount rates dynamically using real-time data, presenting one or more comparable groups to the user, each comparable group comprising one discount item and the respective comparable items, and furthering the sales process based on user input responding to the presented one or more comparable groups. Also disclosed is a method further comprising receiving a request from the user for multiple sub-items associated with the item, and engaging in a dialog with the user to enable payment for each of the multiple sub-items with one of a multiple payment types.

20 Claims, 10 Drawing Sheets

Hotel Booking Confirmation

604 — Thank you for making a reservation with us, your confirmation number is 2U4X3S.

606 — This is your purchased package for $899, you saved 36% over retail price!

608 —

| ~~$1388~~ $899 | St. Lucia (description) | Westin (description) | Beachfront | Direct ocean view –Deluxe | All-Inclusive | 5 Star |
|---|---|---|---|---|---|---|

610 — The Westin St Lucia is on the idyllic Caribbean island of St. Lucia in the West Indies. This Luxury condominium resort features 92 two-bedroom units and 16 three-bedroom units, totaling 232 guest rooms, all with views of Praslin Bay. Amenities include an 18-hole Greg Norman designed golf course managed by Troon, Clubhouse, a 9,125 square foot spa with outdoor meeting space, a 50 slip marina, marina village, additional mixed-use components and more. Starwood manages the hotel and condominiums under its upper upscale brand, Westin Hotels & Resorts.

612 —
Sales Price:   $856.19
Tax:           $42.81

Total Price:   $899.00

Television Purchase Confirmation

904 — Thank you for making a purchase, your confirmation number is 1Zxxxxxx.

906 — This is your purchased television for $1169, you saved 42% over retail price!

908 —

| ~~$1799~~ $1169 | Phillips | LCD | 42" | 1080P | 2 HDMI | 8,000:1 Contrast Ratio |
|---|---|---|---|---|---|---|

910 — Enjoy the ultimate viewing experience of this Philips Flat TV with Perfect Pixel HD Engine, Ambilight 2 Channel and Full HD 1080p display. Enjoy your multimedia content with the built in USB.

Sales Price:   $1100.23
912 — Tax:          $68.77

Total Price:   $1169.00

SYSTEM AND METHOD FOR CONDUCTING SALES

PRIORITY INFORMATION

The present application is a continuation of U.S. patent application Ser. No. 11/776,019, filed Jul. 11, 2007. The contents of which is incorporated herein by reference in its entirety.

BACKGROUND OF THE INVENTION

1. Field of the Invention

The present invention relates to the field of conducting sales transactions, and more particularly to a system, method, and computer-readable medium for conducting semi-opaque sales transactions.

2. Introduction

Currently, many on-line systems complete sales transactions in an opaque manner for various reasons. For example, the travel industry extensively uses opaque sales by withholding details about a product until after the purchase. Travel service providers such as hotel providers, airlines, and car rental companies maximize revenue by selling the correct balance of inventory at a higher price while not alienating customers that are willing to pay a lower price for the service. The objective is to encourage retail customers to pay the full price while garnering incremental customers that will not pay full price. Attempting to reach this optimal balance is called yield management.

Yield management may impact travelers' sensitivity to price because many travelers have learned from experience that the price for the same service can vary hugely. Statistics show that travelers search on multiple travel websites or call multiple travel call centers when planning trips. Travelers tend to distrust any one specific source until they have checked the rate across multiple sources.

Many travel service providers have become wise to this phenomenon and have introduced a rate-parity requirement across multiple sales channels. Rate parity is the concept that the service should be the same price anywhere the traveler searches for the service. To further this objective, service providers have introduced low-rate guarantee programs to ensure that rate-parity exists across all sales channels.

Service-providers may distribute their distressed or excess inventory at a discount to a variety of third-party aggregation sites (such as Expedia®, Travelocity®, and Orbitz®) to maximize occupancy as long as their full rate sales channels are not disrupted. However, service-providers hesitate to do so because they do not want to undercut their existing pricing. Specifically, a traveler may be willing to pay the full rate for the service because of loyalty or familiarity but may find a discounted rate offered by a third-party acceptable.

This is where opaque sales methods apply. Opaque sales methods do not reveal the specific details of the product or service until after it is purchased. Specific examples of companies that employ opaque sales methods are Priceline® and Hotwire®. Priceline and Hotwire both describe the item to be purchased in general terms without specifically identifying the exact details of either the product or service provider. The customer is informed of the details only after committing to purchase or after actually purchasing. Because the discounted offers are so generic in nature, many travelers are uncomfortable blindly purchasing a totally opaque travel service, even at discounted rates, because they are not confident in the quality or reputation of the purchased item. As a result, many travel service providers are limited in their ability to sell their excess inventory.

A method of sales has been known to those of skill in the art in the travel industry. Travel agents would show a customer a group of hotel brochures and tell the customer that a particular package includes one from the group of hotels displayed in the brochures. The travel agent would later select one from the group based on availability or other factors. Further, the travel agent practice of showing hotel brochures may not fully disclose comparable details between the hotels and a customer may know nothing about the hotels. A customer has no assurances beyond that of the travel agent as to the attributes and qualities of the hotels represented in the brochures. Travel agents cannot feasibly maintain groups of current brochures for every possible location, either.

While the problems with opaque marketing are easily visible in the travel industry, various other industries also employ opaque marketing techniques. Yet other industries are eager to enjoy the benefits of opaque sales, i.e. increasing sales of excess products or services, but are hesitant because of the potential downsides of opaque marketing.

Accordingly, what is needed in the art is a way to increase sales of products or services at a discount price to customers who are not willing to pay the full price without diminishing the number of sales to customers willing to pay the full price, and a way to make customers more comfortable about purchasing an undisclosed product or service.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods, and computer readable media for conducting sales transactions. An example method embodiment for conducting sales comprises receiving an inquiry with at least one parameter from a user associated with a sale of an item, identifying a discount item from a class of items that satisfies the inquiry, dynamically identifying at least one comparable item to the discount item at nondiscount rates using real-time data, presenting a comparable group to the user comprising the discount item and the at least one comparable item, furthering the sales process based on user input responding to the presented comparable group, and wherein the presented comparable group does not identify to the user which is the discount item and which is the at least one comparable item. Also disclosed herein is a method further comprising receiving a request from the user for multiple sub-items associated with the item, and engaging in a dialog with the user to enable payment for each of the multiple sub-items with one of a multiple payment types.

This sales method is a semi-opaque approach as opposed to the opaque approach mentioned in the introduction. Opaque sales are transactions where all the details of the object of the transaction are withheld until after the transaction is complete. In common terms, it is completing a purchase "sight unseen." Semi-opaque sales are transactions where all the details of the object of the transaction are disclosed as in a non-opaque sale, but the user is still not informed as to exactly which item will be the object of the transaction. In this manner, details of the object of the transaction are fully disclosed, but one or more key pieces of information are withheld, for example, which object out of a list of objects is to be the eventual object of the transaction.

Another exemplary embodiment is a network based service which is accessible, for example, via the internet. In this embodiment, an entity will operate at least one computing device that communicates with a user on a client device to conduct a sale of a product and/or service. In this regard, the computing device will present information to the end user and receive input from the end user in the manner described herein. Upon completing a sale, the computing device may then communicate with the manufacturer or service provider to enable the end user to receive the product or service purchased.

As part of the interaction with the user, the system may enable the user to request an item (such as a hotel room, widget or service) and also request multiple sub-items associated with the item. Examples of sub-items may be hotel rooms associated with a hotel, or multiple widgets (associated with a widget), or a particular type of service, such as accounting and legal services as multiple sub-items to the item of professional services. The system may engage in a dialog with the user to enable payment for each sub-item via a separate credit card. A preferable point in the semi-opaque interaction with the user would be after the user accepts one of the group of presented options and before the system presents the user with notification of which item has been purchased. It may be during this preferable point in the interaction that the system receives the information regarding how the user or multiple users will pay for one or more of the sub-items via different credit cards.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A1 illustrates an example configuration for a computer-implemented semi-opaque sales method;

FIG. 2A2 illustrates another example configuration for a computer-implemented semi-opaque sales method;

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
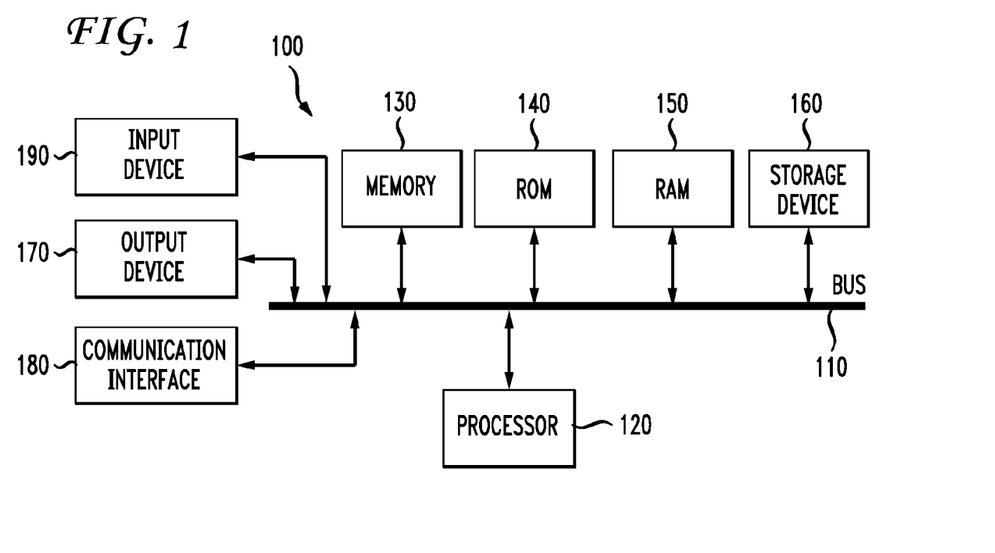
FIG. 1 illustrates a basic system or computing device embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2A:
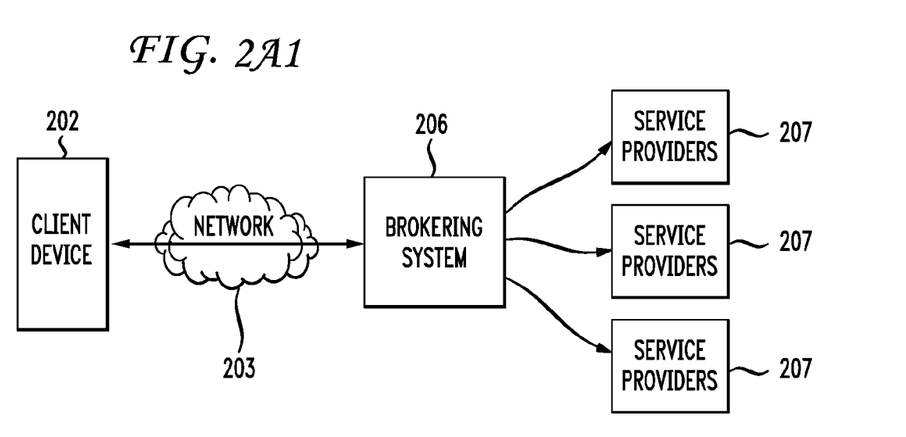

FIG. 2A1 illustrates an example configuration for a computer-implemented semi-opaque sales method. A user uses a client device 202 to communicate with the brokering system 206 across a network 203. The client device may be a telephone, personal digital assistant (PDA), smartphone (like an iPhone® or Blackberry®), laptop, desktop, call center, or any other suitable device. The brokering system 206 may interact with one or more service providers 207. The illustration of the service providers 207 represents entities that manufacture the goods, distribute the goods, provide services or any combination of these. For example, a service provider may be a hotel chain that the broker system 206 has booked a room for. The brokering system 206 may either take orders and complete sales itself, and pass the order information to the service providers in the role of a broker. As a broker, the brokering system 206 may not complete any transactions at all, but may connect interested customers with service providers either directly or by arranging for future communication via phone or email. As a broker, the brokering system 206 may actually complete sales and report those sales to the service providers in return for a commission. Many broker/service provider arrangements are known in the art which may be used.

Figure 2A:
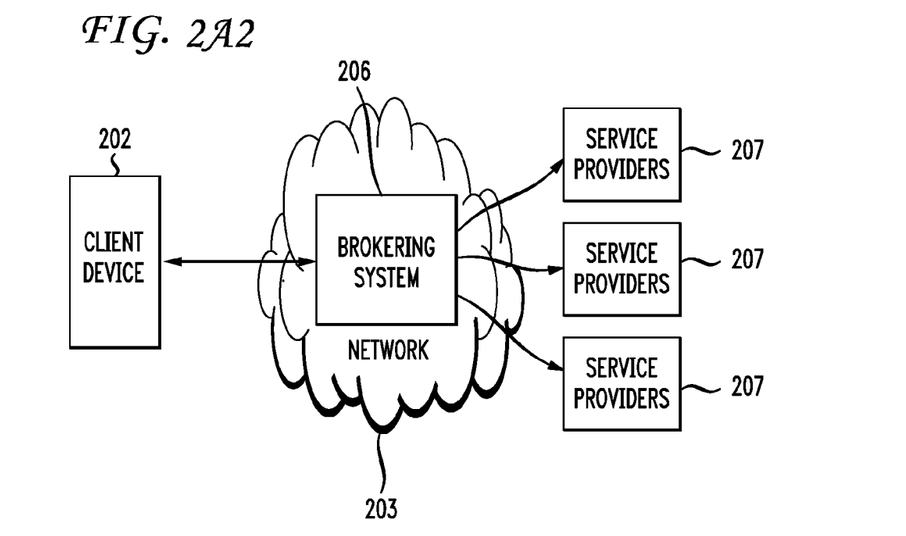

The brokering system 206 in example 2A1 resides across a network from the client devices, but may reside in many other configurations, such as the configuration illustrated in FIG. 2A2. FIG. 2A2 illustrates another example configuration for a computer-implemented semi-opaque sales method. The brokering system 206 may reside entirely within the network 203. The brokering system 206 may be implemented in one physical location or may be spread out among multiple locations or implemented in multiple pieces of hardware or software. Multiple systems 206 could be provided, perhaps one for each industry area (i.e. one system for travel services, one system for insurance, one system for legal services, etc), or one for each service provider (one for Geico®, one for Allstate®, one for Progressive®). If multiple systems are used for each provider within one industry, each system may share the same real-time information regarding comparable items.

Figure 2B:
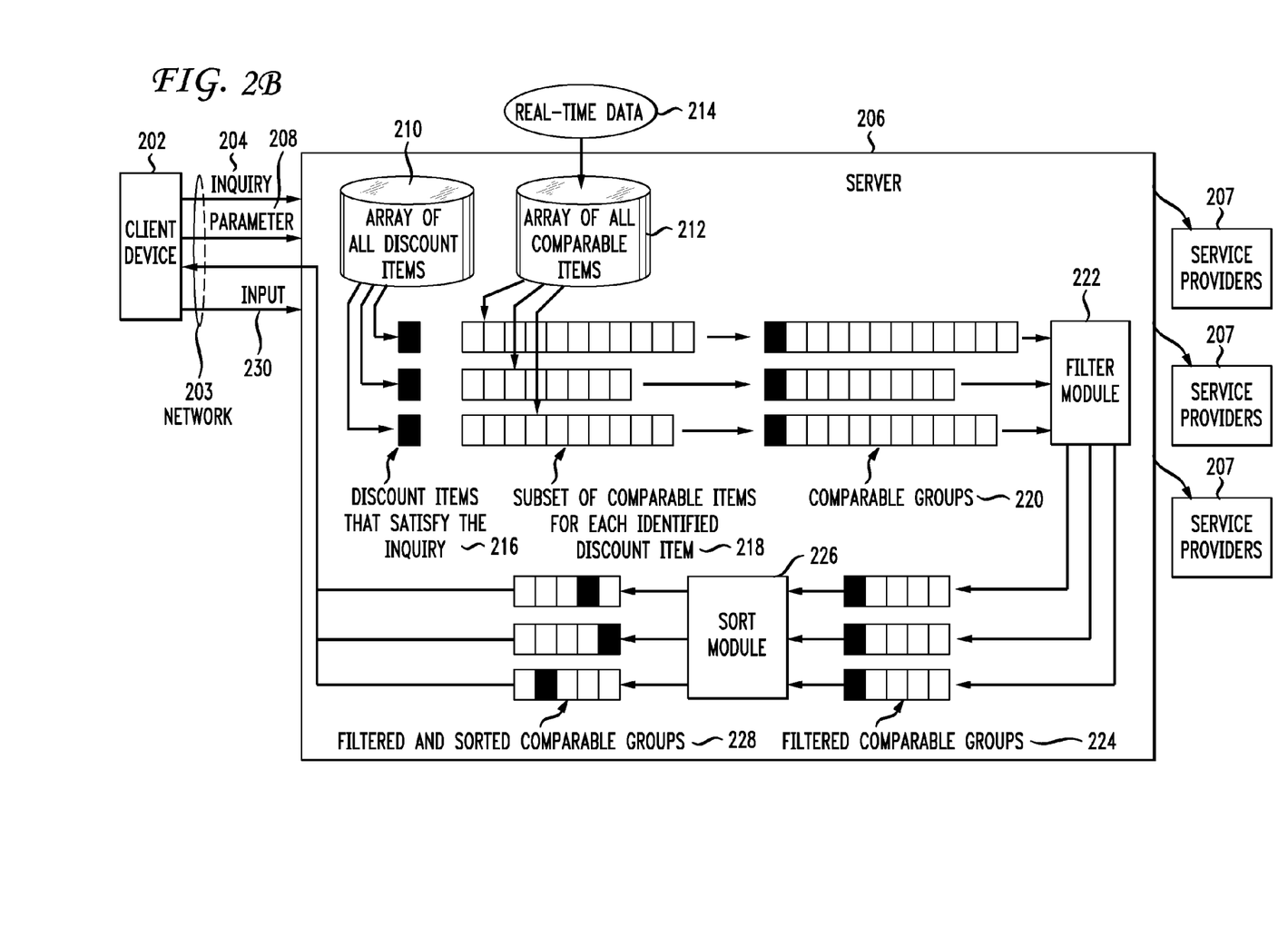
FIG. 2B illustrates a detail view of the implementation of FIG. 2A1 and 2A2.

FIG. 2B illustrates a detail view of the implementation of the brokering system "black box" in FIGS. 2A1 and 2A2. FIG. 2B illustrates an example brokering system for selling hotel room reservations to users, although the system and method may apply to any product, service, or combination thereof. A user may interact with the system by means of a client device such as a laptop, desktop, cellular phone, personal digital assistant (PDA), etc. that communicates over a network 203 with the server 206. A client device 202 first may open a website operated by the server 206 and enter a purchase inquiry 204 directed to the server regarding a hotel reservation. Although a web interface is one possibility in this example, the client device 202 and server may interact in any number of ways, including via a computer terminal, phone interface, interactive voice response (IVR) system, or call center. The server 206 may be a single computer, a portion of a single computer, a group of computers, or any other configuration capable of performing the necessary steps. The purchase inquiry could be entered by filling a form on a webpage, clicking on a link offering a package deal, speaking to a customer service representative over a phone, or any other form of interaction between a client device and a user. The purchase inquiry is accompanied with one or more parameters 208 for the purchase inquiry. The parameters may be explicit or implicit. One explicit parameter may be if the user 202 checks a checkbox signifying "Only show me rooms with a king bed." One implicit parameter may be if a client device clicks on a link for an advertised package deal to the Bahamas. In that case, the client device 202 expressed an understood, implicit parameter that the hotel be located in the Bahamas. Some possible parameters for a hotel reservation might include location, star rating, whether or not breakfast is offered, a range of dates, swimming pool availability, concierge services, valet, room service, etc. An example of more than one parameter in the context of hotel sales could be a user requesting a four-star hotel with a swimming pool, continental breakfast, and near a movie theater. If the item for sale is an automobile, some possible parameters might include color, gas mileage, leather interior, engine size, airbags, etc. Any shared feature which may be compared between like items may be used as a parameter.

The server then selects from an array of all discount items 210, one or more discount items that satisfy the parameters of the inquiry 216. FIG. 2B shows three discount items 216 being selected that satisfy the inquiry. This could represent in a travel package example, a request for Caribbean travel packages, and the three discount items that satisfy the inquiry could be hotels in St. Lucia, St. Thomas, or St. John. If the user requests ski resorts, the Vail Four Seasons, Big Sky Ritz, or Park City Hyatt could be selected. Discount items may comprise multiple destinations or a single destination, if the destination or destinations fit the parameters of the inquiry.

Next the server analyzes real-time data 214 to create an array of all comparable items 212. In our example, some comparable items may be Marriott®, Comfort Inn®, Embassy Suites®, and Ramada®. Real-time data 214 may be updated by a third party, may be obtained directly from the service or product provider, or may be obtained any other way. Real-time may have a flexible meaning Real-time in the context of extremely time-sensitive products or services where prices fluctuate quickly based on availability and demand, like hotel or airline reservations, may mean that the data are no older than 5 minutes. With less time-sensitive products or services where prices do not fluctuate on a moment's notice, like consumer electronics or furniture, real-time data may mean that the data are no older than 72 hours. The threshold for determining what real-time means may depend on the type of product or service offered. One skilled in the art should know how to understand and implement real-time as it relates to sales of a particular product or service.

For each discount item 216 that satisfies the inquiry 204, the server 206 dynamically selects a subset of comparable items 218 from the array of all comparable items 212, based on at least one attribute of each discount item. Each subset may contain a variable number of items, depending on how many items are returned from the array of all comparable items. The server combines each discount item 216 with the respective subset of comparable items 218 into comparable groups 220. The comparable groups may be processed by a filter module 222 into filtered comparable groups 224. The filter module may be a separate computing device or devices, a routine to perform filtering, or anything else capable of filtering the comparable groups. The filter module may filter comparable groups in a number of ways. If the filter module is intended to return the best five results, then the filter module could allow one discount item and allow the best five minus one or four items in the comparable group. The filter module could filter based on one or more additional parameter or explicitly exclude designated items or item attributes.

Returning to the hotel example, if a buyer seller specifically requested that a particular attribute or item not be included then items matching the name Motel 6® could be filtered out or if a buyer requested valet service, only hotels with valet service would pass through the filter 222. A seller, or provider of a discount item, may also choose to employ filtering. A seller may request that their product or service not be compared with particular other items. For example, if Hilton® were a service provider, Hilton may request that only 3 or 4 star hotels be compared with Hilton. If the filter module is too aggressive and the comparable group is of insufficient size, parameters may be broadened to allow more items in the filtered comparable groups.

The filtered comparable groups 224 may be sent to a sorting means 226 to be sorted in to filtered and sorted comparable groups 228. The sorting means 226 may be configured to sort in any desired order. Sorting of comparable groups of hotels may be done in ascending or descending order of price, star ranking, amenities, distance from desired location, etc. Items in comparable groups may be sorted by any of their attributes or in any other order. Although it may appear counterintuitive, the sorting means may even randomize the filtered comparable group to veil the identity of any discount items from the user. The filtered and sorted comparable groups may be presented to the user in any of a number of ways, for example, via a computer terminal, web interface, phone interface, interactive voice response (IVR) system, call center, etc. The actual retail prices may be presented with the filtered and sorted comparable groups for the user to reference with a discount price, if desired.

When the sorted and filtered comparable groups 228 are presented to the user, in order to achieve semi-opaque results, any discount items 216 preferably remain unidentified as the discount item so that the user does not know which items may actually be offered and which, if any, items are merely comparable items 218. All items in the comparable group may be displayed at full retail price or the user may also be allowed to select a number of items in the comparable group that the user is interested in, and receive a price quote for each selected item in the comparable group.

The user may then be prompted with a message like "If any of the listed hotels is acceptable at a discounted price of $300, click OK." The user sends input 230 to the server 206 responding to the one or more presented comparable group. The input may be a mouseclick, filling out credit card information, a verbal acceptance to a call-center employee, biometric confirmation like a fingerprint or retina scan, or any other means of input and may include a multi-modal input. The server 206 may then further the sale based on the received user input 230. Some of the possible ways to further the sale include disclosing which item in the presented comparable group is the discount item that the user has agreed to purchase, gathering credit card or other payment information, transferring the user to the actual manufacturer or service provider, taking size information (if an article of clothing is to be sold), gathering delivery information, recording personal information about the customer, displaying a confirmation page, sending a confirmation email, or anything else that incrementally moves the customer closer to completing the transaction. This list of ways to further the sale is not necessarily comprehensive. Others may be known to those of skill in the art. Some ways of furthering the sale may not apply to all of the types of products offered, for example, gathering a T-shirt size of a customer may be appropriate to further the sale of a T-shirt, but inappropriate to further the sale of legal services.

In one variation, the discount item purchased may not be disclosed until a predetermined date or time after the user has agreed to purchase. The predetermined date or time may be absolute or relative. An example of an absolute predetermined date or time would be in all sales made between March 1 and March 7, the discount item may not be revealed until March 10. A relative predetermined date or time may be withholding the identity of the purchased discount item until ten days after the purchase. This technique may be employed to prevent users from "gaming" the system where one individual commits to a sale for the purpose of discovering which item in the comparable group is a discount item and spreading that information to others, which would negate the semi-opaque aspect.

Another variation could be presenting the user an option, either for free or for a fee, to eliminate a certain number of items in the presented comparable group. This variation could serve to provide users with further assurances that they will be comfortable with the actual item purchased. If a fee is charged for this service, the fee could be a flat fee, like $50, or the fee could be based on the difference between the lowest and the next lowest prices for the discount item, if more than one discount item is available in the comparable group, or the fee could be based on any other factor. The fee could be retained or all or part of the fee could be applied as a credit towards the eventual purchase price. The number of items could be determined by calculating the most items that could be eliminated while retaining at least one discount item in the comparable group, and selecting any number up to that limit. In this way, a user could eliminate items from the comparable group that the user feels are potentially unfavorable so the user feels more comfortable with the transaction.

Yet another variation may be presenting the user an option, either for free or for a fee, to terminate the sales process and/or any sales commitments at a later point. If a fee is required, the fee may be retained or applied as a credit towards the eventual purchase price. This variation allows users to be more confident that they will be satisfied with their purchase. Although this variation may be offered for free, in practice, it will likely be a service that is charged to tempt the user to spend some money which would be a sunk cost towards a purchase, if all or part of the money is applied to the eventual purchase price. Users would be able to "purchase" confidence in the sale by retaining the freedom to back out at a later time if the user is unhappy with the discount item.

With goods that are easily divisible, such as a hotel room package being divided into multiple rooms for multiple nights, more than one customer may wish to combine and purchase the package together, but pay for each respective portion individually. Credit card numbers or other payment means may be gathered for each individual in a party. Some items may not naturally lend themselves to multiple party purchases. For example, purchasing televisions, as discussed below. Televisions are usually singularly owned, so consumers do not typically combine purchasing power on a television. However, if 3 televisions or other large-ticket item were sold at a discount as a package, a multiple party purchase may apply.

Figure 3:
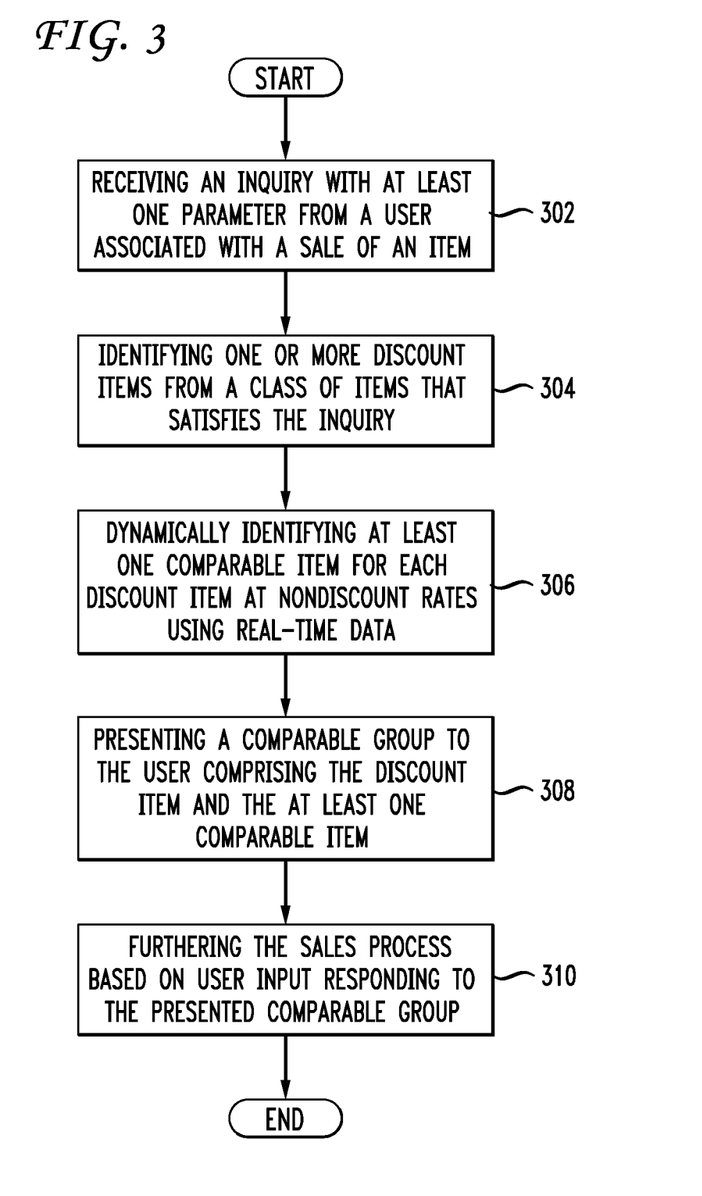
FIG. 3 illustrates a method embodiment of the invention.

FIG. 3 illustrates a method embodiment of the invention. The computer-implemented method may be practiced in various medium interfaces, such as computer terminals, internet, telephones, interactive voice response systems, call centers, portable computing devices (such as iPhone®, Palm® or Windows Mobile® personal digital assistant, RIM Blackberry®, cellular phone, etc.), multi-modal interactive devices, etc. First, the method comprises receiving an inquiry with at least one parameter from a user associated with a sale of an item (302). In a hotel sales context, the inquiry parameters could include dates, a city, specific regions in a city, amenities like pool or continental breakfast, star rating like 2-star or 4-star, nearby facilities (i.e. restaurants, theaters, metro, etc.), or other parameters. Second, the method comprises identifying one or more discount items from a class of items that satisfies the inquiry (304). Discount items could be distressed or excess inventory from hotels that desire to boost occupancy through yield management by selling rooms at a lower rate to customers who would not otherwise buy a room at full price. One of the identified discount items will ultimately be sold to the customer if the customer agrees to the transaction. Third, the method comprises dynamically identifying at least one comparable item for each discount item at nondiscount rates using real-time data (306). Real-time data may be pulled from various hotel websites, a travel services database, distribution information for products, or other source. The real-time data are examined to identify items that are comparable to the discount item in at least one attribute. The comparable items could be the same star ranking if the inquiry is based on a star ranking, or the comparable items could be in the same neighborhood, if the inquiry is based on a specific location. The comparable items should satisfy the inquiry and be substantially similar to the respective discount item.

Fourth, the method comprises presenting a comparable group to the user comprising the discount item and the at least one comparable item (308). The user is presented the discount item and comparable items as a group, not a list from which to select a desired item. In addition to the group itself, specific details about each item in the group could be presented, if available. Some specific details may include address, features, amenities, pictures, reviews, or any other information considered useful in making a purchase decision. These additional details could serve to put the user at ease about a decision to accept any of the items in the group. In this manner, the sales method is semi-opaque. The user does not go into the transaction blindly like the completely opaque models used by Priceline or Hotwire, which completely hide the brand and product by disclosing only general information about the product to be purchased. Completely opaque sales methods may alienate users who are uneasy about unknown information. In a semi-opaque sales method, the user may view the details of each item in the comparable group, such as name, address, pictures, descriptions, and the user may carefully research the items through a third party if she desires, even though the user does not know which item in the comparable group is a discount item. Even though the user may not know which item in the comparable group will be offered, the user can be confident that he would be comfortable with each of the items in the comparable group, so the unknown doesn't take him by surprise. Since each item in the comparable group satisfies the inquiry, the user should already more or less expect items with attributes of the comparable group.

Fifth, the method comprises furthering the sales process based on user input responding to the presented comparable group (310). Furthering the sales process could be actually making the sale of the hotel room, charging a deposit for the hotel room and charging the rest later, directing the user on to a discounted hotel website as a broker, or some other similar act that at least incrementally moves the user closer to a completed sale. User input could be clicking a button on a web page that says "Any of these items is acceptable. I agree to purchase one of these items at the discounted price," a spoken agreement with someone working in a call center, or communicating credit card information. The user input may be any of a variety of ways to accept the offer. The discount item may be identified to the user as the object of the sale at any time, but in a semi-opaque system, the most advantage is preserved by withholding identification until after the user agrees that any item in the comparable group is acceptable and commits to purchase one of the items in the comparable group for the discount price.

Because the semi-opaque method guarantees that the traveler is agnostic to the specific item or service provider, the provider of the discount item is assured that the sale is incremental and does not diminish the number of customers willing to pay full price. Further, the travel service-provider can continue to sell the full rate product directly and employ the rate-parity guarantee if the traveler must have their specific service.

This semi-opaque sales method could be used to sell hotels, airfare, travel packages, consumer electronics, computers, insurance, loans, legal services, medical services, furniture or any other product or service that is quantifiable into specific attributes which can allow comparable groups to be generated around a discount item.

Figure 4:
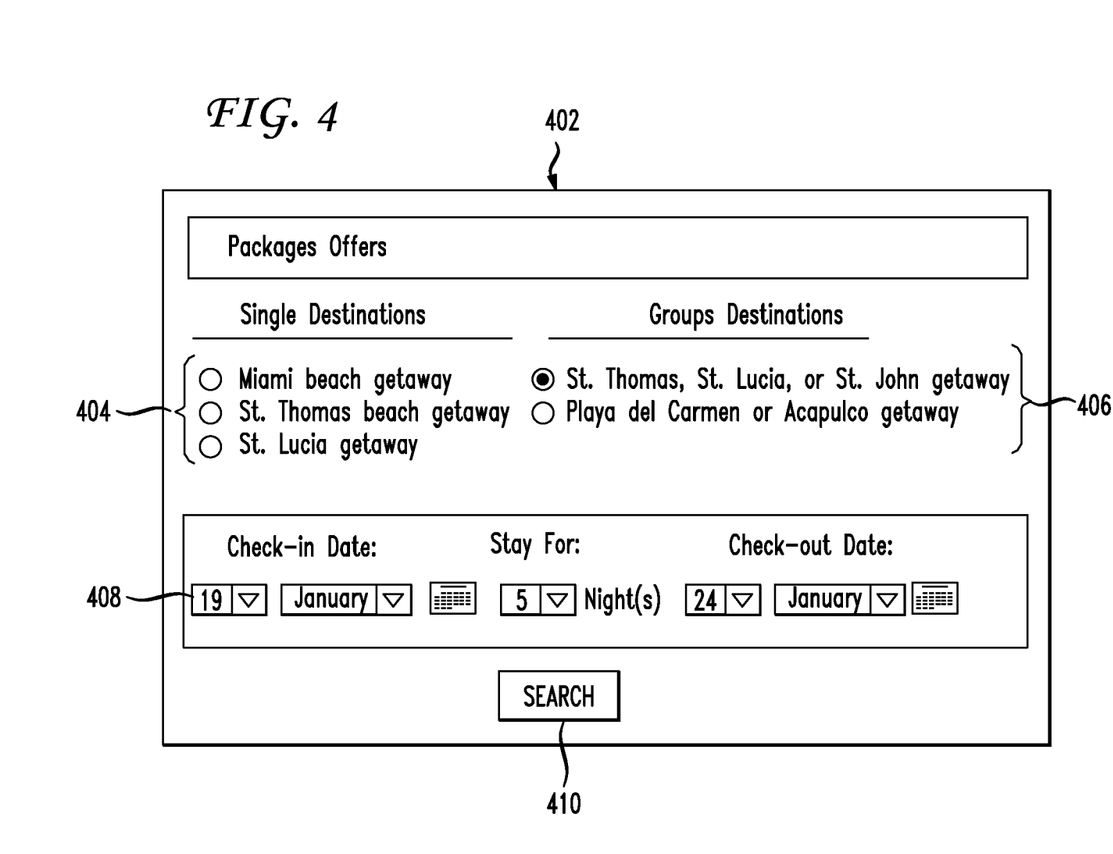
FIG. 4 illustrates a screenshot of an inquiry page in a web implementation of a semi-opaque travel site.

FIG. 4 represents a sample screen shot of how a user might inquire about an item. FIG. 4 illustrates a web browser but as has been discussed, the invention may be practiced in a number of ways, including but not limited to computer terminals, internet, telephones, interactive voice response systems, call centers, etc. The web page 402 may contain one or more ways to select one or more parameters 404, 406, 408 for a group of items. Other means of indicating parameters could include a text search field that allows users to search across all items, touchtone or spoken responses to an automated interactive voice response system, or any other way known in the art to indicate parameters. After the user has entered sufficient parameters for an inquiry, the user may click the search button 410. The search button is for illustration purposes only and is not to be taken as a limitation. It may be interchanged with other labels, buttons, or other means to commit an inquiry or may be completely absent.

Figure 5:
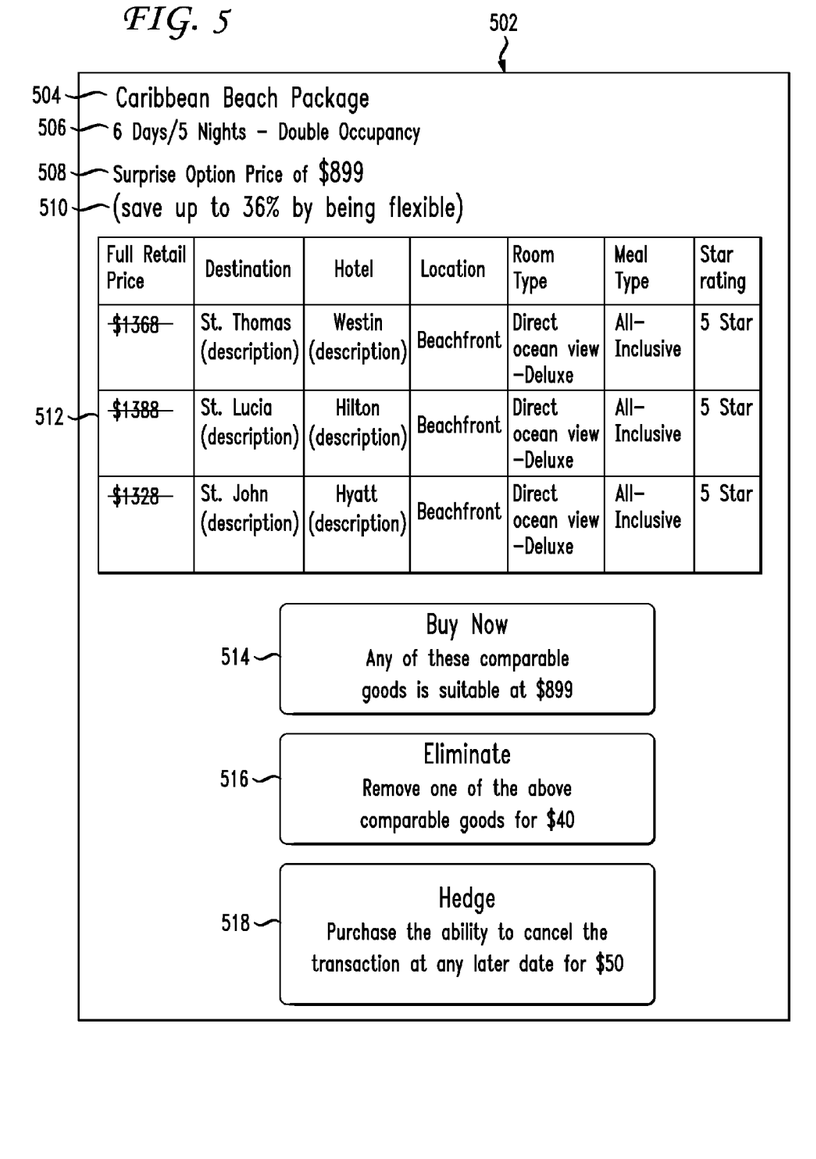
FIG. 5 illustrates a screenshot of a results page in a web implementation of a semi-opaque travel site.

FIG. 5 illustrates a sample screen shot of what might be returned to a user whose inquiry parameters indicated a Caribbean Beach Package deal. The web page 502 may contain a title 504, a short description of the overall parameters 506, an indication of the offered price for the as-yet-unidentified discount item 508, and/or an indication of savings over full retail price 510. The details of these fields may vary from package to package dynamically based on available discount and comparable items or based on the inquiry parameters. The exact text of these fields is intended to illustrate, not limit, how the invention may be implemented. The indication of savings, for example, may be shown as a percentage, a precise dollar amount, both, or neither. For example, the indication of savings in FIG. 5 could show "Save up to 36%" or "Save up to $489."

A table 512 or other comparison means may be used to present the list of items in the comparable group to the user in a webpage setting. In this example, three packages are returned that satisfy the inquiry parameters. Details of each may be shown in place or may be accessible through a link.

When a user decides to purchase based on the presented information, a buy now button 514 could be clicked. Other means of indicating a purchase could be used. The small text on the button may be included on the button itself, elsewhere in the page, or may not be included at all. As discussed above, the eliminate button 516 offers the user a chance to select one or more of the items from the presented comparable group to eliminate. In this example, the option is offered for a price of $40, the difference between the lowest and the next lowest full retail prices, but the price may be determined otherwise. The price to eliminate one of the options could even be $0.

If a user decides to purchase but wants to reserve the right to back out of the purchase, the user may click the hedge button 518. In this example, the hedge button offers the user an option to cancel the transaction later for a flat rate of $50, but this rate could also be free or it could be a percentage of any of the full retail prices or the discount price. This feature is an optional part of the web page and may be presented in ways other than a simple button. For example, it could be presented as a popup window just as the user starts to enter credit card information, or via any other presentation means known in the art.

Figure 6:
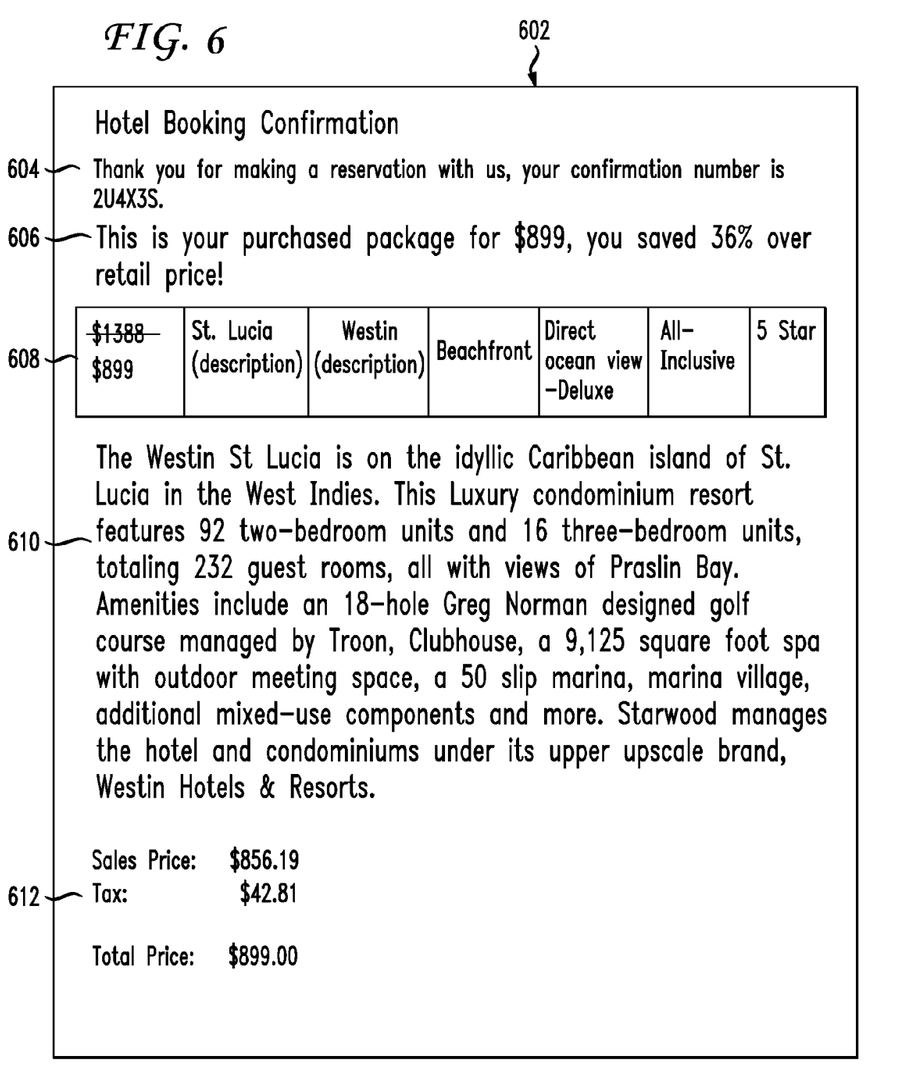
FIG. 6 illustrates a screenshot of a confirmation page in a web implementation of a semi-opaque travel site.

FIG. 6 shows an example confirmation web page 602 of what a user might see after he or she has committed to purchase. A confirmation number or other confirmation means 604 is known in the art. The web page may indicate and/or reiterate the savings over full retail value to the customer 606. In a semi-opaque sales method, at this point or later, the purchased discount item may be identified by displaying the item information 608 as displayed in FIG. 5 as well as an additional detailed description 610 of the purchased discount item. Also, an itemized inventory of the purchase 612 may be provided so customers can print the web page as a confirmation or for financial records.

Figure 7:
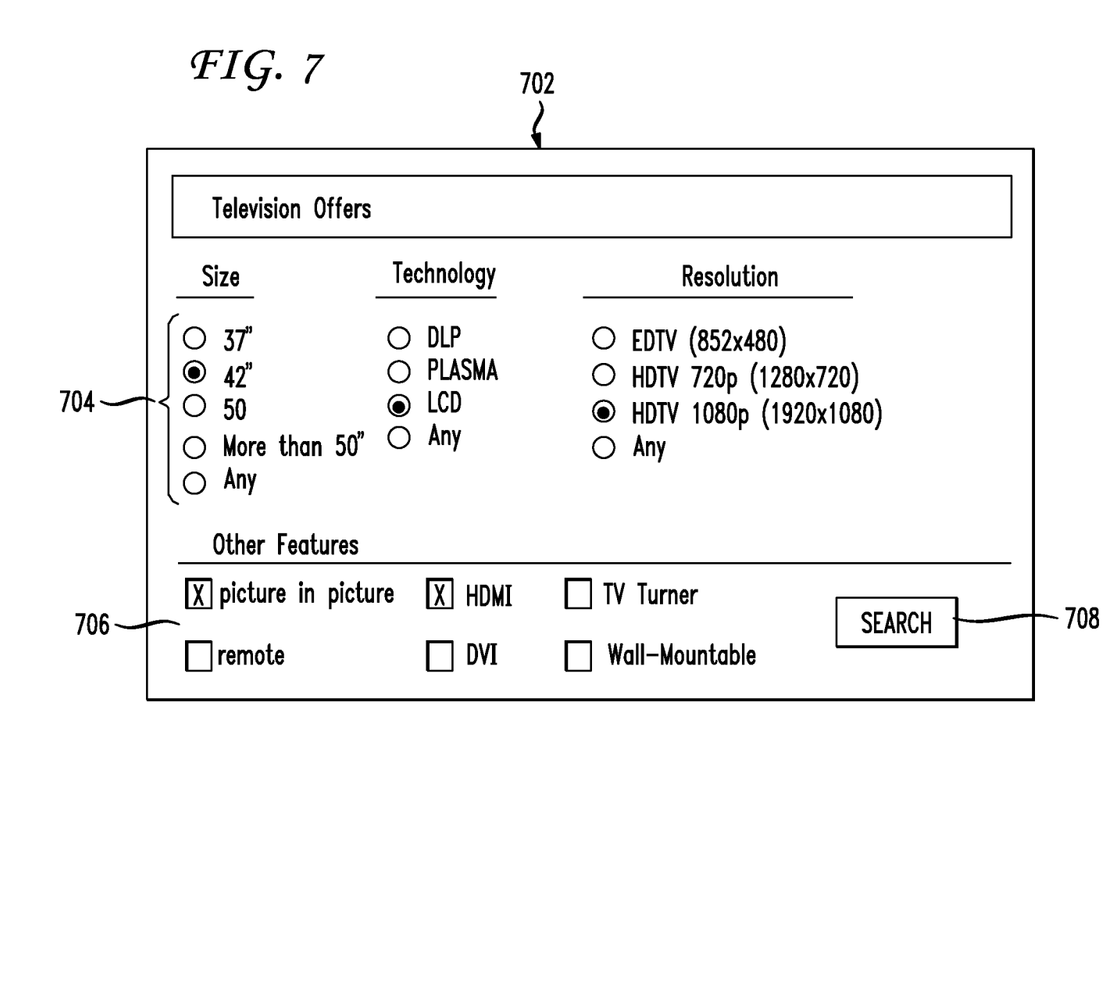
FIG. 7 illustrates a screenshot of an inquiry page in a web implementation of a semi-opaque consumer electronics site.
Figure 8:
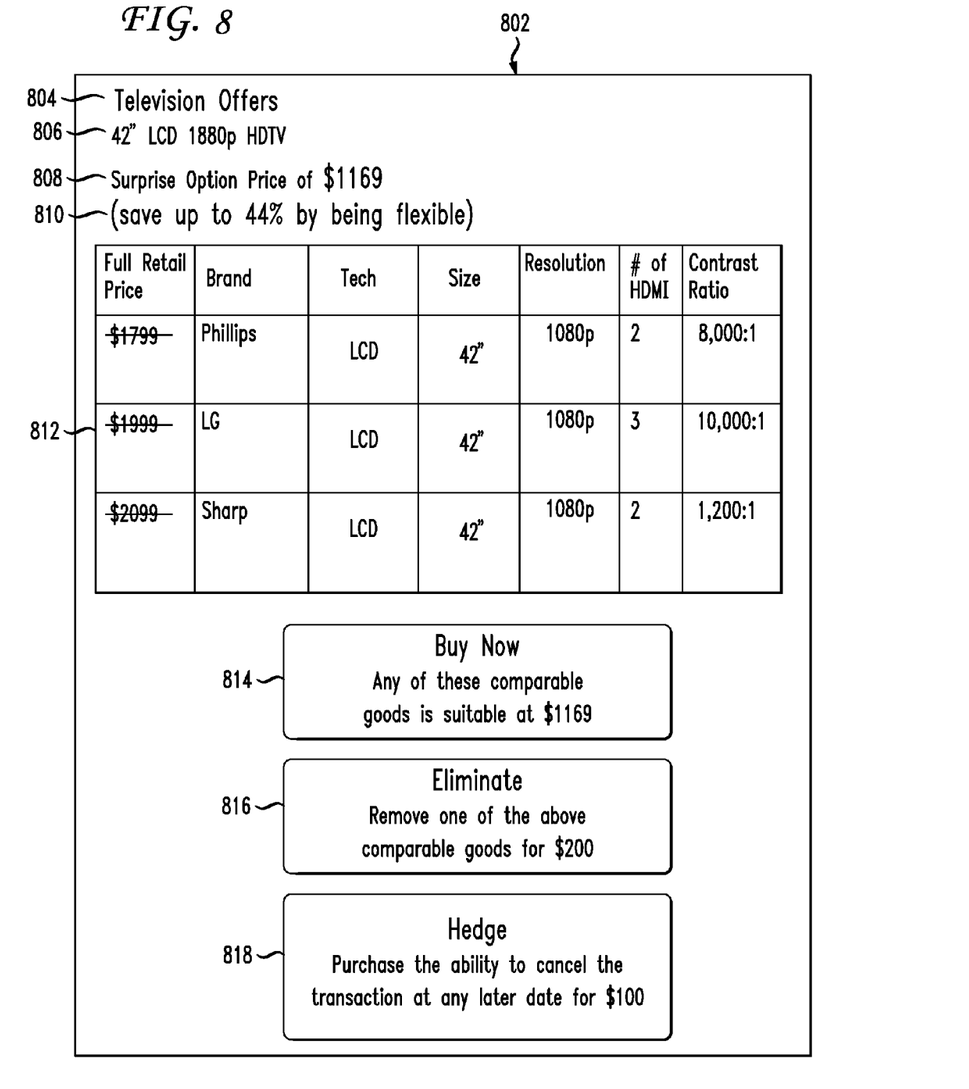
FIG. 8 illustrates a screenshot of a results page in a web implementation of a semi-opaque consumer electronics site.
Figure 9:
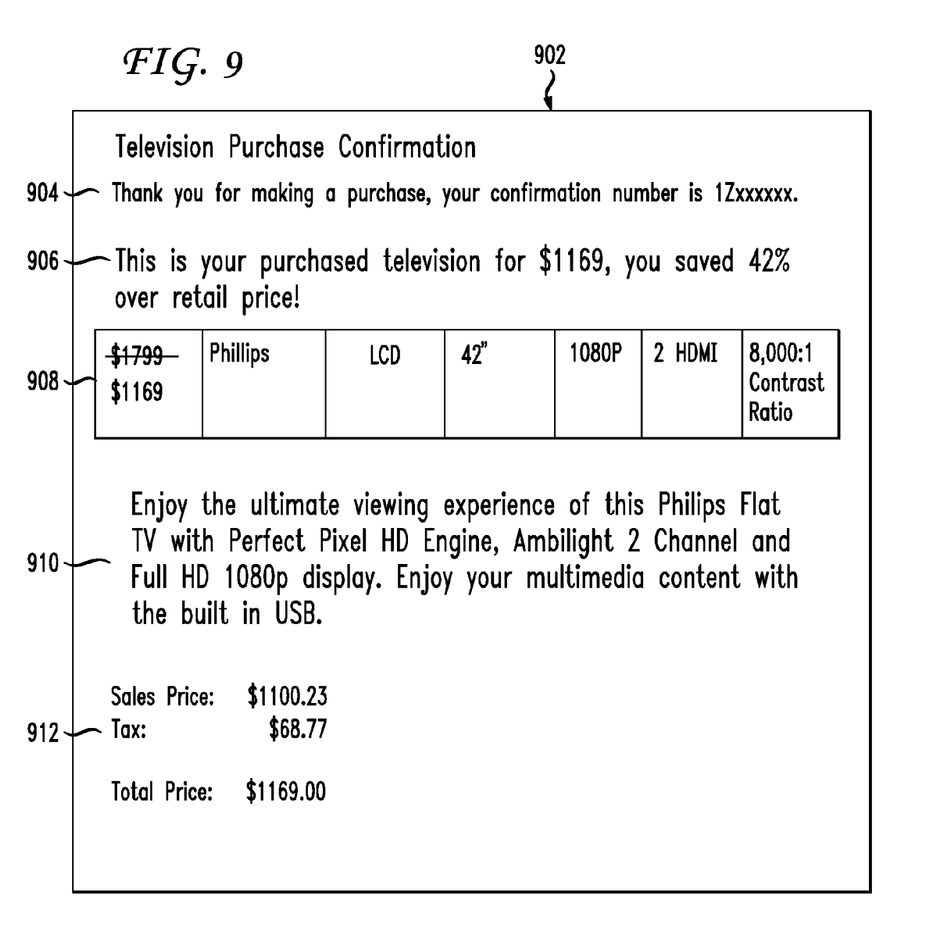
FIG. 9 illustrates a screenshot of a confirmation page in a web implementation of a semi-opaque consumer electronics site.

FIGS. 7-9 are similar to FIGS. 4-6, but illustrate how a user may interact with a semi-opaque sales system that sells televisions. FIG. 7 represents a sample screen shot of how a user might inquire about a television, but this is only an example and is not intended to limit the invention. FIG. 7 illustrates a web browser but as has been discussed, the invention may be practiced in a number of ways, including but not limited to computer terminals, internet, telephones, interactive voice response systems, call centers, etc. The web page 702 may contain one or more ways to select one or more parameters 704, 706 for a group of items. In this example, the first parameters 704 are groups of radio buttons, each group of radio buttons indicating that each group allows for a single selection. The second parameters 706 are checkboxes indicating that any, all, or none of them may be selected. Other means of indicating parameters could include a text search field that allows users to search across all items, touchtone or spoken responses to an automated interactive voice response system, or any other way known in the art to indicate parameters. After the user has entered sufficient parameters for an inquiry, the user may click the search button 708. The search button is for illustration purposes only and is not to be taken as a limitation. It may be interchanged with other labels, buttons, or other means to commit an inquiry or may be completely absent.

FIG. 8 illustrates a sample screen shot of what might be returned to a user whose inquiry parameters indicated a 42" LCD 1080p HDTV. The web page 802 may contain a title 804, a short description of the overall parameters 806, an indication of the offered price for the as-yet-unidentified discount item 808, and/or an indication of savings over full retail price 810. The details of these fields may dynamically vary from package to package based on available discount and comparable items or based on the inquiry parameters. The exact text of these fields is intended to illustrate, not limit, how the invention may be implemented. The indication of savings, for example, may be shown as a percentage, a precise dollar amount, both, or neither. For example, the indication of savings in FIG. 8 could show "Save up to 44%" or "Save up to $930."

A table 812 or other comparison means may be used to present the list of items in the comparable group to the user in a webpage setting. In this example, three televisions are returned that satisfy the inquiry parameters. Details of each may be shown in place or may be accessible through a link.

When a user decides to purchase based on the presented information, a buy now button 814 could be clicked. Other means of indicating a purchase could be used. The small text on the button may be included on the button itself, elsewhere in the page, or may not be included at all. As discussed above, the eliminate button 816 offers the user a chance to select one or more of the items from the presented comparable group to eliminate. In this example, the option is offered for a price of $200, the difference between the lowest and the next lowest full retail prices, but the price may be determined otherwise. The price to eliminate one of the options could even be $0.

If a user decides to purchase but wants to reserve the right to back out of the purchase, the user may click the hedge button 818. In this example, the hedge button offers the user an option to cancel the transaction later for a flat rate of $100, but this rate could also be free or it could be a percentage of any of the full retail prices or the discount price. This feature is an optional part of the web page and may be presented in ways other than a simple button. For example, it could be presented as a popup window just as the user starts to enter credit card information, or via any other presentation means known in the art.

FIG. 9 shows an example confirmation web page 902 of what a user might see after he or she has committed to purchase. A confirmation number or other confirmation means 904 is known in the art. As this is a physical item instead of a service to be provided, the webpage may display a tracking number with the confirmation number. The web page may indicate and/or reiterate the savings over full retail value to the customer 906 in terms of either dollar amount saved or percentage saved. In a semi-opaque sales method, at this point or later, the purchased discount item may be identified by displaying the item information 908 as displayed in FIG. 8 as well as an additional detailed description 910 of the purchased discount item. Also, an itemized inventory of the purchase 912 may be provided so customers can print the web page as a confirmation or for financial records.

The known method of displaying brochures to customers that is used by travel agents is distinguishable from the current invention in at least two ways. First, the group of hotel brochures is not dynamically computer generated in real-time. The group of hotel brochures is a relatively static group which does not change often and is difficult to update in real-time. The group of hotel brochures is not dynamic because the same brochures are usually shown to all customers desiring to go to the same destination. Second, each of the group of hotel brochures is an actual available option. In the semi-opaque embodiment, not all items in the comparable groups may actually be offered. Other differences exist between the face-to-face brochure display method and this invention which should be apparent to one skilled in the relevant art.

Another aspect of this disclosure relates to managing multiple credit cards for at least one user in the semi-opaque offering. In this aspect, at some point in the interaction with the user or users, assume that the user wants to book a hotel but for three rooms. In many instances, there may be a single person booking but there are multiple people who will be staying at the hotel and they may want to stay in rooms close to each other and further may want to pay separately. Therefore, in one example, a user requests multiple hotel rooms, or multiple contiguous hotel rooms, perhaps as part of the initial description of services desired. At some point within the interaction, perhaps after the user has committed to the purchase of one of the presented hotel options, the user may be presented with the opportunity to use a different credit card for each room. At which point a dialog or interactive window enables the user to enter separate information for each room. In some cases, one of the other people who will be staying in another room may not have given the booking user a credit card. In that instance, the system may book the rooms under the booking user's credit card but enable the booking user to provide an email address of another user such that an automated email may be sent out so that the second user can input the credit card information for the second user's room.

Following the entry of the necessary information for booking the rooms, the system may present confirmation information. Further, the notification of which hotel of the presented hotel options may be deferred until after all the credit card information is entered. For example, if the booking user has all of the multiple credit card information available, the interaction may delay notifying the user of which hotel they will stay at until after the acceptance of the offer and credit card information is received. Then the system may present the booking user with the hotel and confirmation information.

The system may engage in a dialog with the user to enable payment for each sub-item via a separate credit card. As has been noted above, a preferable point in the semi-opaque interaction with the user would be after the user accepts one of the group of presented options and before the system presents the user with notification of which item has been purchased. It may be during this preferable point in the interaction that the system receives the information regarding how the user or multiple users will pay for one or more of the sub-items via different credit cards.

Of course the above approach may also apply to products that may be purchased where a user may want to buy three widgets but pay for each with a separate credit card and so forth. Furthermore, payment types may be via credit card, debit card, paypal, or any other type of payment option now existing or developed in the future. For example, one sub-item may be purchased by credit card, another sub-item may be purchased via paypal or debit card, and so forth.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, this semi-opaque method of conducting sales could be applied to consumer electronics like flat-screen televisions or digital cameras. Accordingly, the appended claims and their legal equivalents should only define the invention, rather than any specific examples given.

I claim:

1. A method comprising:
identifying, by a processor, a first item associated with a purchase inquiry, wherein the first item is available at a discount price;
identifying a second item associated with the purchase inquiry, wherein the second item is comparable to the first item and is not available at the discount price;
displaying a semi-opaque offer comprising the first item, the second item, and the discount price, wherein the semi-opaque offer does not identify which of the first item and the second item is available for sale in the semi-opaque offer;
receiving, by the processor, a commitment from a user to purchase an item based on the semi-opaque offer; and
disclosing the first item as the item actually purchased after receiving the commitment.

2. The method of claim 1, wherein the semi-opaque offer is displayed via at least one of a computer terminal, a web interface, a phone interface, an interactive voice response system, a portable computing device, and a call center.

3. The method of claim 1, wherein each of the first item and the second item comprises at least one of a product and a service.

4. The method of claim 1, wherein the semi-opaque offer further comprises a quote of a non-discount price for at least one of the first item and the second item.

5. The method of claim 1, further comprising disclosing the first item after a predetermined time after receiving the commitment.

6. The method of claim 1, further comprising receiving a second commitment to purchase sub-items associated with the first item.

7. The method of claim 6, further comprising allowing payment of the sub-items through an alternative payment option that is different than a payment option used for the first item.

8. A system comprising:
a processor; and
a non-transitory computer-readable storage medium having stored therein instructions which, when executed by the processor, cause the processor to perform a method comprising:
identifying a first item associated with a purchase inquiry, wherein the first item is available at a discount price;
identifying a second item associated with the purchase inquiry, wherein the second item is comparable to the first item and is not available at the discount price;
displaying a semi-opaque offer comprising the first item, the second item, and the discount price, wherein the semi-opaque offer does not identify which of the first item and the second item is available for sale in the semi-opaque offer;
receiving a commitment from a user to purchase an item based on the semi-opaque offer; and
disclosing the first item as the item actually purchased after receiving the commitment.

9. The system of claim 8, wherein the semi-opaque offer is displayed via at least one of a computer terminal, a web interface, a phone interface, an interactive voice response system, a portable computing device, and a call center.

10. The system of claim 8, wherein each of the first item and the second item comprises at least one of a product and a service.

11. The system of claim 8, wherein the semi-opaque offer further comprises a quote of a non-discount price for at least one of the first item and the second item.

12. The system of claim 8, the non-transitory computer-readable storage medium storing additional instructions which, when executed by the processor, result in the method further comprising disclosing the first item after a predetermined time after receiving the commitment.

13. The system of claim 8, the non-transitory computer-readable storage medium storing additional instructions which, when executed by the processor, result in the method further comprising receiving a second commitment to purchase sub-items associated with the first item.

14. The system of claim 13, the non-transitory computer-readable storage medium storing additional instructions which, when executed by the processor, result in the method further comprising allowing payment of the sub-items through an alternative payment option that is different than a payment option used for the first item.

15. A non-transitory computer-readable storage medium having stored therein instructions which, when executed by a processor, cause the processor to perform a method comprising:
identifying a first item associated with a purchase inquiry, wherein the first item is available at a discount price;
identifying a second item associated with the purchase inquiry, wherein the second item is comparable to the first item and is not available at the discount price;
displaying a semi-opaque offer comprising the first item, the second item, and the discount price, wherein the semi-opaque offer does not identify which of the first item and the second item is available for sale in the semi-opaque offer;
receiving a commitment from a user to purchase an item based on the semi-opaque offer; and
disclosing the first item as the item actually purchased after receiving the commitment.

16. The non-transitory computer-readable storage medium of claim 15, wherein the semi-opaque offer is displayed via at least one of a computer terminal, a web interface, a phone interface, an interactive voice response system, a portable computing device, and a call center.

17. The non-transitory computer-readable storage medium of claim 15, wherein each of the first item and the second item comprises at least one of a product and a service.

18. The non-transitory computer-readable storage medium of claim 15, wherein the semi-opaque offer further comprises a quote of a non-discount price for at least one of the first item and the second item.

19. The non-transitory computer-readable storage medium of claim 15 storing additional instructions which, when executed by the processor, result in the method further comprising disclosing the first item after a predetermined time after receiving the commitment.

20. The non-transitory computer-readable storage medium of claim 19 storing additional instructions which, when executed by the processor, result in the method further comprising receiving a second commitment to purchase sub-items associated with the first item.

* * * * *